United States Patent
Hanner et al.

(10) Patent No.: US 8,296,723 B2
(45) Date of Patent: Oct. 23, 2012

(54) CONFIGURABLE UNIFIED MODELING LANGUAGE BUILDING BLOCKS

(75) Inventors: Michael Hanner, Kanata (CA); Daniel Donat Joseph Leroux, Kanata (CA); Dusko Misic, Kanata (CA); David Douglas Springgay, Ottawa (CA); Mira Vrbaski, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 12/332,923

(22) Filed: Dec. 11, 2008

(65) Prior Publication Data

US 2010/0153907 A1 Jun. 17, 2010

(51) Int. Cl.
G06F 9/44 (2006.01)

(52) U.S. Cl. ........ 717/104; 717/101; 717/110; 717/107; 717/108

(58) Field of Classification Search .......... 717/101–178; 370/229; 702/179; 703/6, 22; 706/46, 59; 705/300, 348; 463/9; 715/762–763
See application file for complete search history.

(56) References Cited

U.S. PATENT DOCUMENTS

| | | | |
|---|---|---|---|
| 6,330,527 B1 * | 12/2001 | Jung et al. | 703/22 |
| 6,625,804 B1 * | 9/2003 | Ringseth et al. | 717/114 |
| 7,334,216 B2 * | 2/2008 | Molina-Moreno et al. | 717/109 |
| 7,424,701 B2 * | 9/2008 | Kendall et al. | 717/105 |
| 7,506,320 B2 * | 3/2009 | Bhandari et al. | 717/133 |
| 7,657,411 B2 * | 2/2010 | Poetsch et al. | 703/6 |
| 7,823,122 B1 * | 10/2010 | Englehart | 717/106 |
| 7,840,913 B1 * | 11/2010 | Agrawal et al. | 703/22 |
| 7,840,936 B2 * | 11/2010 | Seeger et al. | 717/105 |
| 7,890,951 B2 * | 2/2011 | Vinberg et al. | 717/174 |
| 2002/0069400 A1 * | 6/2002 | Miloushev et al. | 717/108 |
| 2002/0108099 A1 * | 8/2002 | Paclat | 717/102 |
| 2003/0135850 A1 * | 7/2003 | Miloushev et al. | 717/165 |
| 2005/0060696 A1 * | 3/2005 | Bicsak et al. | 717/156 |
| 2006/0129369 A1 | 6/2006 | Gaudette | |
| 2007/0061743 A1 | 3/2007 | Golbandi | |
| 2007/0157159 A1 * | 7/2007 | Fildebrandt et al. | 717/104 |
| 2007/0220479 A1 * | 9/2007 | Hughes | 717/100 |
| 2007/0245319 A1 * | 10/2007 | Muenkel et al. | 717/136 |
| 2007/0277151 A1 * | 11/2007 | Brunel et al. | 717/113 |
| 2008/0163159 A1 * | 7/2008 | Oara et al. | 717/104 |
| 2008/0163161 A1 * | 7/2008 | Shaburov et al. | 717/105 |

(Continued)

OTHER PUBLICATIONS

NPL-Specification of Function Block Applications with UML, Wei Zhang and Wolfgang A. Halang Faculty of Electrical and Computer Engineering FernUniversity at Hagen Christian Diedrich Institut of Automation and communication, Germany—Jan. 10, 2006.*

(Continued)

*Primary Examiner* — Lewis A Bullock, Jr.
*Assistant Examiner* — Francisco Aponte
(74) *Attorney, Agent, or Firm* — Yee & Associates, P.C.; Daniel McLoughlin

(57) ABSTRACT

Illustrative embodiments provide a computer-implemented method for configurable Unified Modeling Language building blocks. The computer-implemented method obtains a Unified Modeling Language specification and generates a set of logical units from the Unified Modeling Language specification to form a set of building blocks. The computer-implemented method further fetches desired blocks from the set of building blocks according to predefined criteria to form a set of desired blocks, and presents the set of desired building blocks to a requestor for execution of functions provided by the set of desired building blocks to complete a defined task.

17 Claims, 11 Drawing Sheets

U.S. PATENT DOCUMENTS

2008/0295068 A1* 11/2008 Kendall et al. ................ 717/104
2009/0158244 A1* 6/2009 Foumani ....................... 717/105
2009/0192849 A1* 7/2009 Hughes et al. .................... 705/7

OTHER PUBLICATIONS

Murzek et al., "Structural Patterns for the Transformation Business Process Models", Proceedings of the 10th IEEE on International Enterprise Distributed Object Computing Conference Workshops, IEEE Computer Society, Washington, DC, USA, 2006, pp. 1-8.

Kobryn et al., "System Modeling Language Overview", SysML Partners, Oct. 2003, pp. 1-23.

"Advanced UML 2.1 Modeling", Telelogic Datasheet, 2006 Telelogic AB, pp. 1-2.

Alphonce et al., "Green: A Customizable UML Class Diagram Plug-In for Eclipse", OOPSLA '05, Oct. 16-20, 2005, San Diego, California, USA, ACM, New York, NY, USA, pp. 108-109.

* cited by examiner

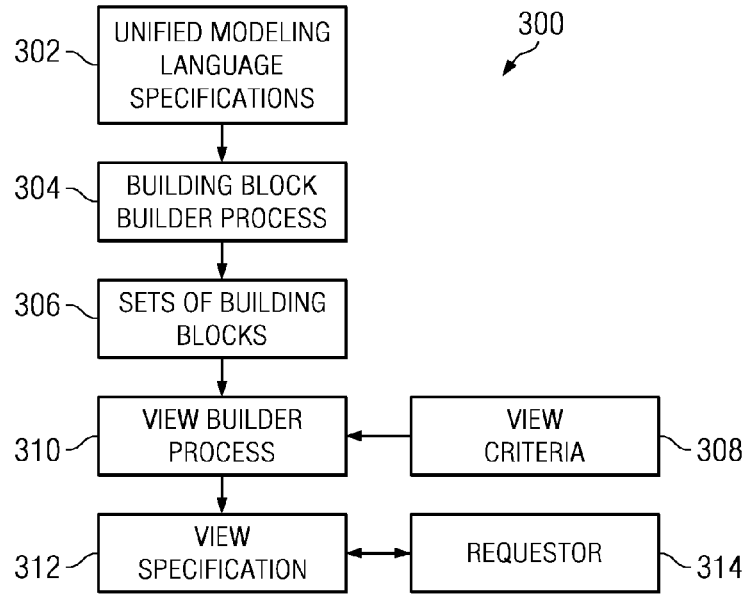

FIG. 3

| UML DIAGRAM BUILDING BLOCK | UML DIAGRAM |
|---|---|
| UML CLASS DIAGRAM | CLASS DIAGRAM |
| UML COMPOSITE STRUCTURE DIAGRAM | COMPOSITE STRUCTURE DIAGRAM |
| UML COMPONENT DIAGRAM | COMPONENT DIAGRAM |
| UML DEPLOYMENT DIAGRAM | DEPLOYMENT DIAGRAM |
| UML OBJECT DIAGRAM | OBJECT DIAGRAM |
| UML USE CASE DIAGRAM | USE CASE DIAGRAM |
| UML ACTIVITY DIAGRAM | ACTIVITY DIAGRAM |
| UML STATE MACHINE DIAGRAM | STATE MACHINE DIAGRAM |
| UML SEQUENCE DIAGRAM | SEQUENCE DIAGRAM |
| UML COMMUNICATION DIAGRAM | COMMUNICATION DIAGRAM |
| UML FREEFORM DIAGRAM | FREEFORM DIAGRAM |

FIG. 4

| UML ELEMENT BUILDING BLOCK | UML ELEMENTS |
|---|---|
| PACKAGE | PACKAGE |
| USE CASE 1 | USE CASE<br>ACTOR<br>EXTENSION POINT<br>INCLUDE |
| USE CASE 2 | EXTEND |
| SUBSYSTEM | SUBSYSTEM |
| STEREOTYPED ARTIFACT | STEREOTYPED ARTIFACT |
| ARTIFACT | ARTIFACT |
| STEREOTYPED CLASS | STEREOTYPED CLASS |
| CLASS | CLASS |
| STEREOTYPED COMPONENT | STEREOTYPED COMPONENT |
| COMPONENT | COMPONENT<br>COMPONENT REALIZATION<br>STEREOTYPED COMPONENT |
| ABSTRACT RELATION | DERIVED ABSTRACTION<br>ABSTRACTION REFINE<br>ABSTRACTION TRACE<br>ABSTRACTION |
| INTERFACE | INTERFACE<br>INTERFACE REALIZATION |
| USAGE | USAGE |
| COMMENT 1 | COMMENT<br>COMMENT ATTACHMENT |
| COMMENT 2 | URL<br>URL ATTACHMENT |
| TYPES 1 | ENUMERATION<br>ENUMERATION LITERAL |
| TYPES 2 | BOOLEAN LITERAL<br>INTEGER LITERAL<br>UNLIMITED NATURAL LITERAL<br>INSTANCE BOOLEAN LITERAL<br>DATA TYPE<br>PRIMITIVE TYPE |

*FIG. 5a*

| | |
|---|---|
| TYPES 3 | ENCAPSULATED CLASSIFIER<br>PARAMETABLE ELEMENT<br>CONNECTABLE ELEMENT<br>STRING EXPRESSION<br>STRUCTURED CLASSIFIER |
| TYPES 4 | OPAQUE BEHAVIOR<br>OPAQUE EXPRESSION |
| CONSTRAINT | CONSTRAINT<br>CONSTRAINT ATTACHMENT<br>OPERATION BODY CONSTRAINT<br>OPERATION POSTCONDITION CONSTRAINT<br>LOCAL PRECONDITION CONSTRAINT<br>LOCAL POSTCONDITION CONSTRAINT<br>INTERACTION CONSTRAINT<br>OPERATION PRECONDITION CONSTRAINT |
| SIGNAL | RECEPTION<br>USAGE SEND<br>SIGNAL |
| STEREOTYPED DEPLOYMENT 1 | STEREOTYPED COMMUNICATION PATH<br>STEREOTYPED NODE |
| DEPLOYMENT 1 | DEPLOYMENT<br>COMMUNICATION PATH<br>NODE |
| DEPLOYMENT 2 | DEVICE<br>MANIFESTATION<br>EXECUTION ENVIRONMENT |
| DEPLOYMENT SPECIFICATION | DEPLOYMENT SPECIFICATION |
| TEMPLATE | CLASSIFIER TEMPLATE PARAMETER<br>TEMPLATE PARAMETER<br>REDEFINABLE TEMPLATE SIGNATURE<br>ADVANCE TEMPLATE PARAMETER<br>TEMPLATE SIGNATURE<br>TEMPLATE PARAMETER SUBSTITUTION |
| FUNCTIONAL TEMPLATE PARAMETER | CONNECTABLE TEMPLATE PARAMETER<br>OPERATION TEMPLATE PARAMETER<br>ATTRIBUTE TEMPLATE PARAMETER |
| COMPONENT TEMPLATE PARAMETER | COMPONENT TEMPLATE PARAMETER |
| CLASS TEMPLATE PARAMETER | CLASS TEMPLATE PARAMETER |

| | |
|---|---|
| INTERFACE TEMPLATE PARAMETER | INTERFACE TEMPLATE PARAMETER |
| PACKAGE TEMPLATE PARAMETER | PACKAGE TEMPLATE PARAMETER |
| PRIMITIVE TYPE TEMPLATE PARAMETER | BOOLEAN TEMPLATE PARAMETER<br>STRING TEMPLATE PARAMETER<br>UNLIMITED NATURAL TEMPLATE<br>INTEGER TEMPLATE PARAMETER |
| RELATIONSHIP 1 | ASSOCIATION<br>GENERALIZATION |
| RELATIONSHIP 2 | USAGE CALL<br>DIRECT ASSOCIATION<br>AGGREGATION ASSOCIATION<br>COMPOSITE ASSOCIATION<br>ASSOCIATION CLASS<br>SUBSTITUTION<br>INSTANTIATE<br>INFORMATION FLOW<br>USAGE RESPONSIBILITY |
| REALIZATION | REALIZATION |
| DEPENDENCY | DEPENDENCY |
| COMPOSITE STRUCTURE 1 | CONNECTOR END<br>CONNECTOR<br>PORT<br>PART |
| COMPOSITE STRUCTURE 2 | ROLE<br>PROVIDED INTERFACE<br>REQUESTED INTERFACE<br>INTERFACE REALIZATION |
| COLLABORATION USE | COLLABORATION USE<br>ROLE BINDING |
| INSTANCE | INSTANCE SPECIFICATION<br>SLOT<br>USAGE CREATE<br>LINK |
| SPECIFIC INSTANCE TYPE 1 | NODE INSTANCE<br>CLASS INSTANCE<br>COMPONENT INSTANCE<br>USE CASE INSTANCE<br>ACTION INSTANCE<br>ARTIFACT INSTANCE<br>DEVICE INSTANCE<br>INTERFACE INSTANCE<br>ACTOR INSTANCE<br>STATE MACHINE INSTANCE<br>COLLABORATION INSTANCE |

| | |
|---|---|
| SPECIFIC INSTANCE TYPE 2 | STEREOTYPE CLASS INSTANCE<br>STEREOTYPE NODE INSTANCE<br>STEREOTYPE COMPONENET INSTANCE<br>SIGNAL INSTANCE<br>ENUMERATION INSTANCE<br>PRIMITIVE TYPE INSTANCE<br>DATA TYPE INSTANCE<br>STEREOTYPE ARTIFACT INSTANCE<br>DEPLOYMENT SPECIFICATION INSTANCE<br>EXECUTION ENVIRONMENT INSTANCE |
| ACTIVITY 1 | PARTITION<br>ACTIVITY<br>INITIAL<br>ACTIVITY FINAL<br>DECISION NODE<br>CONTROL NODE<br>MERGE<br>FORK<br>JOIN<br>FLOW FINAL<br>CONTROL FLOW |
| ACTIVITY 2 | RAISE EXCEPTION ACTION<br>ACCEPT EVENT<br>SEND SIGNAL<br>CENTRAL BUFFER<br>DATA STORE<br>ACTIVITY PARAMETER<br>INPUT PIN<br>OUTPUT PIN<br>VALUE PIN<br>ACTIVITY EDGE<br>OBJECT NODE<br>OBJECT FLOW |

*FIG. 5d*

| | |
|---|---|
| ACTIVITY 3 | STRUCTURED ACTIVITY<br>LOOP NOTE<br>CONDITIONAL NODE<br>CALL BEHAVIOR ACTION<br>ACCEPT CALL ACTION<br>ACCEPT EVENT ACTION<br>BROADCAST SIGNAL<br>REPLAY ACTION<br>SEND OBJECT<br>CREATE LINK OBJECT<br>DESTROY LINK<br>READ LINK OBJECT END QUALIFIER<br>READ EXTENT<br>READ LINK OBJECT END<br>READ SELF<br>READ IS CLASSIFIED<br>RECLASSIFY OBJECT<br>START CLASSIFIER BEHAVIOR<br>READ LINK<br>DESTROY OBJECT<br>TEST IDENTITY<br>CLEAR STRUCTURAL FEATURE<br>READ STRUCTURAL FEATURE<br>REMOVE STRUCTURAL FEATURE VALUE<br>CLEAR VARIABLE VALUE<br>READ VARIABLE<br>REMOVE VARIABLE<br>ADD VARIABLE VALUE<br>ADD STRUCTURAL FEATURE VALUE<br>CREATE OBJECT<br>CREATE LINK<br>CLEAR ASSOCIATION<br>ACTIVITY EDGE GUARD<br>ACTIVITY NODE<br>SEND SIGNAL ACTION<br>ACTIVITY PARTITION |
| EVENT 1 | CALL EVENT<br>SIGNAL EVENT |
| EVENT 2 | SIGNAL EVENT<br>CHANGE EVENT<br>TIME EVENT |
| STATE MACHINE 1 | STATE CHOICE POINT<br>TRANSITION<br>EXIT POINT<br>INITIAL STATE<br>ENTRY POINT<br>DEEP HISTORY<br>JUNCTION POINT<br>CHOICE POINT |

*FIG. 5e*

| | |
|---|---|
| STATE MACHINE 2 | FINAL STATE<br>EXIT ACTIVITY<br>TRANSITION TRIGGER<br>GUARD CONDITION<br>EFFECT<br>SHALLOW HISTORY<br>JOIN<br>PSEUDOSTATE TYPES<br>FORK<br>ORTHOGONAL STATE<br>TERMINATE<br>REGION<br>CONNECTION POINT REFERENCE<br>SUBMACHINE STATE<br>DO ACTIVITY<br>ENTRY ACTIVITY<br>STATE MACHINE METHOD<br>COMPOSITE STATE<br>TRANSITION TRIGGER<br>GUARD CONDITION<br>EFFECT<br>SHALLOW HISTORY |
| COLLABORATION | COLLABORATION |
| LIFELINE | LIFELINE |
| SEQUENCE 1 | REPLAY<br>SYNCHRONOUS MESSAGE<br>ASYNCHRONOUS MESSAGE |
| SEQUENCE 2 | DESTRUCTION EVENT<br>CREATE MESSAGE<br>DESTROY MESSAGE<br>BEHAVIOR EXECUTION SPECIFICATION<br>INTERACTION OCCURRENCE<br>EXECUTION OCCURRENCE<br>INTERACTION USE |
| COMMUNICATION | MESSAGE PATHWAY<br>MESSAGE<br>REVERSE MESSAGE |
| ELEMENT IMPORT 1 | ELEMENT IMPORT<br>PACKAGE IMPORT |
| ELEMENT IMPORT 2 | PACKAGE MERGE |
| PROFILE | EXTENSION<br>EXTENSION END<br>PROFILE<br>STEREOTYPE |

*FIG. 5f*

| FRAGMENT | OPTIONAL COMBINED FRAGMENTS<br>ALTERNATIVE COMBINED FRAGMENTS<br>BRAKE COMBINED FRAGMENTS<br>WEAK COMBINED FRAGMENTS<br>STRICT COMBINED FRAGMENTS<br>PARALELL COMBINED FRAGMENTS<br>CRITICAL COMBINED FRAGMENTS<br>NEGATIVE COMBINED FRAGMENTS<br>ASSERT COMBINED FRAGMENTS<br>LOOP COMBINED FRAGMENTS<br>IGNORE COMBINED FRAGMENTS<br>COMBINED FRAGMENTS<br>CONSIDER COMBINED FRAGMENTS |
|---|---|
| INTERACTION | INTERACTION METHOD<br>INTERACTION OCCURENCE<br>INTERACTION OPERAND<br>INTERACTION |
| FUNCTION | ATTRIBUTE<br>PARAMETER<br>OPERATION<br>RETURN RESULT<br>PRIMITIVE FUNCTION<br>VARIABLE |
| ACTION | ACTION |
| PROFILE APPLICATION | PROFILE APPLICATION |

*FIG. 5g*

CONFIGURABLE UNIFIED MODELING LANGUAGE BUILDING BLOCKS

BACKGROUND OF THE INVENTION

1. Field of the Invention

The present invention relates generally to modeling languages and, more specifically, to a system, a computer-implemented method, and computer program product for configurable Unified Modeling Language building blocks.

2. Description of the Related Art

Unified Modeling Language™ (UML) is a standardized general-purpose modeling language in the field of software engineering. Unified Modeling Language was developed from a set of previously used modeling languages and includes a set of graphical notation techniques to create abstract models of specific systems, referred to as Unified Modeling Language models. The Unified Modeling Language standard specification may be obtained from The Object Management Group Inc., which administers the standard, over the Internet, by contacting info@omg.org.

Unified Modeling Language 2.1 is a version of the Unified Modeling Language with a very broad scope. The current specification of the Unified Modeling Language covers a large and diverse set of application and development stages including requirements, design, implementation, testing and operation. The identified stages suggest that the modeling language should be structured modularly, with the ability to select only the components of the language of direct interest. On the other hand, the flexibility provided increases the likelihood that different Unified Modeling Language tools support different subsets of the language, leading to interchange problems between the tools.

In an attempt to overcome the interchange problem, the Unified Modeling Language 2.1 specification defines compliance levels. There are only four compliance levels defined for the complete Unified Modeling Language specification. Dividing the components as defined in the Unified Modeling Language specification into only four levels does not typically give enough flexibility for building a set of parts for certain applications or development stages.

BRIEF SUMMARY OF THE INVENTION

According to one embodiment of the present invention, a computer-implemented method for configurable Unified Modeling Language building blocks is provided. The computer-implemented method obtains a Unified Modeling Language specification and generates, by a processor unit, a set of logical units from the Unified Modeling Language specification to form a set of building blocks. The computer-implemented method further fetches desired blocks from the set of building blocks according to predefined criteria to form a set of desired blocks, and presents the set of desired building blocks to a requester, wherein executing, functions provided by the set of desired building blocks on the computer complete a defined task.

In another illustrative embodiment, a data processing system for configurable Unified Modeling Language building blocks comprises a bus, a memory connected to the bus, wherein the memory contains computer-executable instructions stored therein, a communications unit, connected to the bus, a processor unit connected to the bus, wherein the processor unit executes the computer-executable instructions to direct the data processing system to obtain a Unified Modeling Language specification, generate a set of logical units from the Unified Modeling Language specification to form a set of building blocks, fetch desired blocks from the set of building blocks according to predefined criteria to form a set of desired building blocks, and present the set of desired building blocks to a requester, wherein executing functions provided by the set of desired building blocks completes a defined task.

In another illustrative embodiment, a computer program product for configurable Unified Modeling Language building blocks is presented. The computer program product comprises a computer-readable medium having computer-executable instructions stored thereon, wherein the computer-executable instructions comprise, computer-executable instructions for obtaining a Unified Modeling Language specification, computer-executable instructions for generating a set of logical units from the Unified Modeling Language specification to form a set of building blocks, computer-executable instructions for fetching desired blocks from the set of building blocks according to predefined criteria to form a set of desired building blocks, and computer-executable instructions for presenting the set of desired building blocks to a requester, wherein executing functions provided by the set of desired building blocks, on a computer, complete a defined task.

BRIEF DESCRIPTION OF THE SEVERAL VIEWS OF THE DRAWINGS

FIG. 3 is a block diagram of high-level components in a process of creating modeling building blocks, in accordance with illustrative embodiments;

FIG. 4 is a block diagram of a textual representation of a set of diagram components, in accordance with illustrative embodiments;

FIGS. 5A-5G is a set of block diagrams of a textual representation of a set of element components, in accordance with illustrative embodiments;

DETAILED DESCRIPTION OF THE INVENTION

Figure 1:
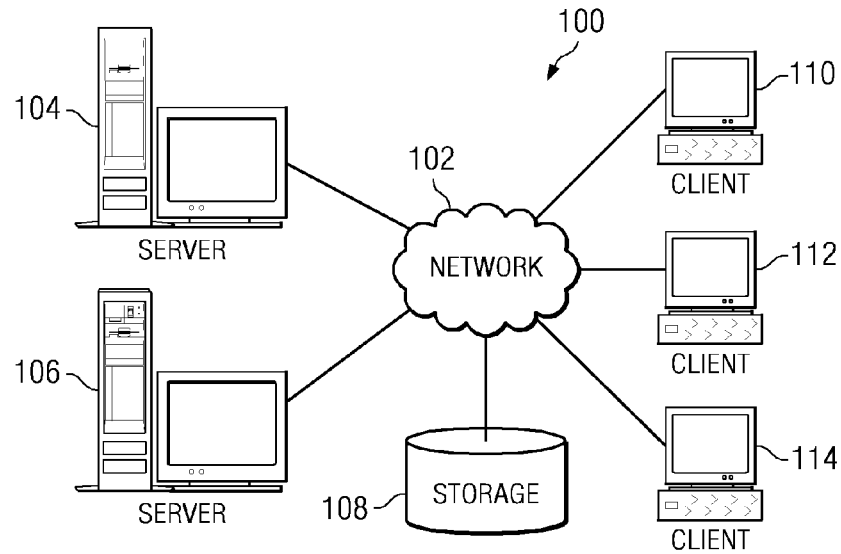
FIG. 1 depicts a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including, but not limited to wireless, wire line, optical fiber cable, RF, etc.

Computer program code for carrying out operations of the present invention may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process, such that the instructions which execute on the computer, or other programmable apparatus, provide processes for implementing the functions/acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Using system 100 of FIG. 1 as an example, a user on client 110 may create a set of building blocks on server 104 for use through network 102 by other users such as one on client 112. The user on client 110 obtains a Unified Modeling Language specification and invokes a building block builder process to generate a set of building blocks according to the specifications of the universal model language. Other specifications may be provided by a tool such as the building block builder. The output of the building block builder is stored on server 104. Sets of building blocks are then selectively retrieved by users such as those on client 112 through network 102 to perform specific tasks such as a requirements task in an application development project.

The capability provides a way to tailor the Unified Modeling Language tools to better meet the users' needs by creating a minimal set of Unified Modeling Language elements. A user may then selectively work with a minimal set of elements delivered as logical units or building blocks and avoid the confusion inherent with a normal approach using many individual Unified Modeling Language elements.

Figure 2:
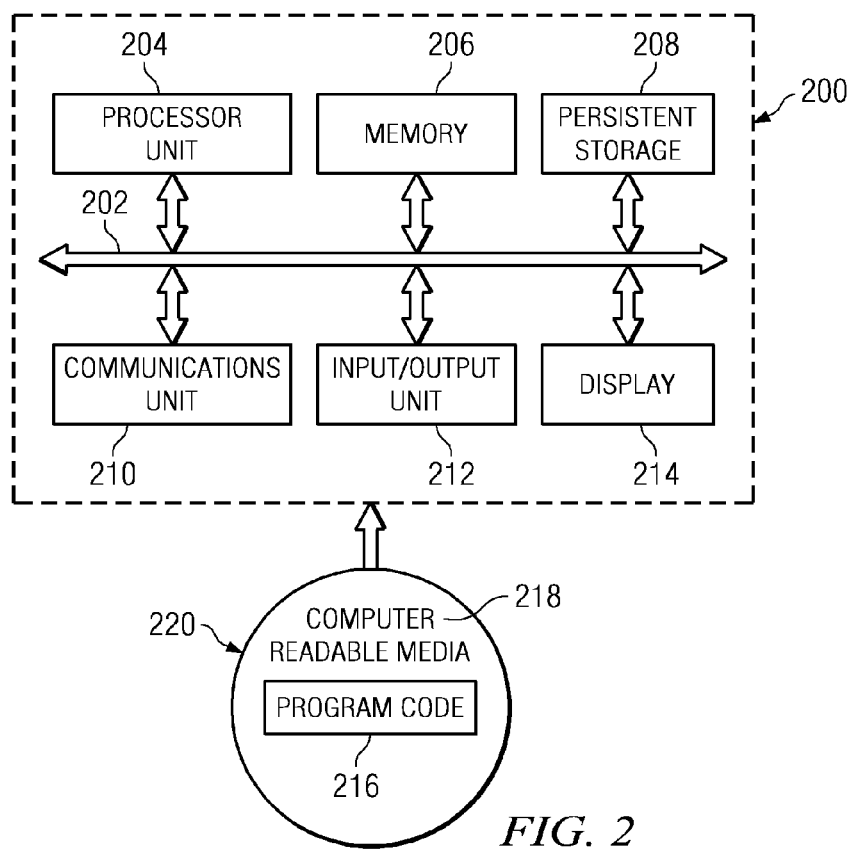
FIG. 2 is a block diagram of a data processing system in which illustrative embodiments may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form of computer-executable instructions on computer-readable media 218 that is selectively removable, and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. Computer-readable media 218 also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With reference to FIG. 3, a block diagram of high-level components in a process of creating modeling building blocks, is presented, in accordance with illustrative embodiments. System 300 is a high level system view of components and relationships in the creation of the modeling building blocks.

UML specifications 302 represents the modeling language specifications as defined by the standard. The specification for Unified Modeling Language version 2.1 is used in the example, but other versions may be used as the versions become available. The specification provides the raw input material for the overall creation and use of the building blocks. The specification can be provided in machine-readable form as direct input for a tool, such as building block builder process 302. For example, if the Unified Modeling Language specification was provided as an extensible markup language document, the document may be parsed by a tool into numerous predefined elements, as defined within the language. The elements may then be collected programmatically into functional sets.

Building block builder process 304 is an example of a process that may be implemented as a combination of hardware and software to form a tooling implementation or tool. Building block builder process 304 receives the Unified Modeling Language specification as input. The input is processed to form sets of building blocks 306. Using the example of the Unified Modeling Language specification as an extensible markup language document, building block builder process 304 would parse the specification to form a set of defined elements.

The primitive elements and relationships are defined in the specification. In addition to the specification defined criteria, additional criteria for collecting elements into sets is provided in tooling of the builder process. For example, the tooling may be optimized to handle extensible markup language source statements with added definitions for a specific project requiring a new diagram or element type not in the standard definitions. In another example, the tooling may provide a capability to collect Unified Modeling Language defined elements into groups not previously specified by the Unified Modeling Language. A building block is defined as the smallest logical set of Unified Modeling Language elements ready to be assembled to meet a particular usage requirement. Examples of building blocks will be presented.

For example, the Unified Modeling Language elements are to be grouped according to the development stage in which they are typically used. Additionally, the Unified Modeling Language elements are to be grouped according to the level of experience of the target user, or "user experience level." Further, a building block may comprise a set of Unified Modeling Language elements. The set consists of one or more elements. A Unified Modeling Language element cannot be used in more than one building block. If duplicates are encountered during the build process, the duplicate must be resolved. When an element is required to be used in more than one instance, the building block can be replicated and used in each instance.

Sets of building blocks 306 comprise two categories or types of building blocks. One type of building block is the Unified Modeling Language diagram building block. In the illustrative embodiments, there are eleven Unified Modeling Language diagram building blocks based on function or area of use. A second type of building block is the Unified Modeling Language element building block. Again using the example of the current Unified Modeling Language version 2.1 specification, 264 elements are defined. The elements provide a fine-grained collection of definitions. In the illustrative embodiments, this set of 264 elements has been reduced to a set of 63 building blocks, according to functional and other criteria.

As building blocks are created in building block builder process 304, the blocks are placed within a storage system. The storage system may be any suitable combination of hardware and software, such as a file system or database stored on a storage device providing selective creation, maintenance and retrieval of the blocks as needed.

View criteria 308 is a set of specifications defining which a subset of building blocks is to be presented to a user. View criteria 308 may be provided as a configuration file in which configurations may be defined for specific user roles, tasks or stages in a development cycle for example. Additionally, a user may be permitted to augment or override presented previously defined view criteria.

View builder process 310 receives the view criteria and fetches the specified building blocks from the storage system. View builder process 310, for example, may be a combination of hardware and software that provides interfaces to allow programmatic selection of specified building blocks. View builder process 310 receives input from view criteria 308 to direct collecting of required building blocks from sets of building blocks 306.

View specification 312 is a collection of user interface elements defining the building blocks that will be presented in a specific instance to a requesting user, such as requestor 314.

The defined interface elements may then be rendered by an existing presentation management system. For example, view builder process 310 generates view specification 312 using view criteria 308 to extract and assemble building blocks from sets of building blocks 306. View specification 312 in this example may be delivered as an extensible markup language stream to a browser. The browser then displays the view on the client or user display device to requestor 314.

With reference to FIG. 4, a block diagram of a textual representation of a set of diagram components is presented, in accordance with illustrative embodiments. Diagram building blocks 400 is an example of the building blocks in the diagram category within sets of building blocks 306 of system 300 of FIG. 3.

In the tabular representation presented, column 402 defines the Unified Modeling Language building block generated by building block builder process 304 of FIG. 3. Column 404 defines the Unified Modeling Language diagram as references in the Unified Modeling Language specification. Set of Unified Modeling Language diagram building blocks 406 defines a collection of currently defined building blocks specific to diagrams. In the example provided, there are 11 diagram building blocks.

Cell 408 defines a building block of Unified Modeling Language class diagram and the corresponding Unified Modeling Language specification diagram is presented in cell 410 as class diagram. In this example, there is a one to one relationship between the diagram building blocks created and the diagrams defined in the Unified Modeling Language specification. Each of the defined building blocks represents a specific diagram ready to be combined with other diagrams or elements for a target user. One diagram is defined in one building block.

With reference to FIGS. 5A-5G, a set of block diagrams of a textual representation of a set of element components in accordance with illustrative embodiments is presented. FIGS. 5A-5G define a collection of Unified Modeling Language elements as generated by building block builder process 304 and stored as sets of building blocks 306 of FIG. 3.

Element building blocks 500 depicts a collection of building blocks that are representative of the elements currently defined in the Unified Modeling Language version 2.1 specification. In the exemplary two column format, column 502 defines the Unified Modeling Language element building block generated by building block builder process 304 of FIG. 3. Column 504 defines a corresponding Unified Modeling Language specification element.

For example, cell 506 defines a Unified Modeling Language element building block of package. The corresponding entry in cell 508 represents the Unified Modeling Language specification for the element package. In another example, cell 510 defines an element type building block of use case 1. The corresponding entry in cell 512 depicts a set of four Unified Modeling Language specification elements. The four elements from the specification are use case, actor, extension point and include. The building block defined in cell 510 is a composition of the four elements from the Unified Modeling Language specification.

In further examples of element building blocks 500, a building block may contain either a single element or a combination of multiple elements. The build criteria provided to building block builder process 304 of FIG. 3 determines whether a building block comprises a single element or multiple elements.

A difficulty with the compliance levels defined by the unified modeling language version 2.1 specification is that most unified modeling language elements fall into level 1, which does not provide flexibility to a user. Flexibility, in this case, means to work with only the minimal diagrams or elements necessary to perform a task. It is important to know in which development stage the user will use a particular element. For example, if a user is in a requirement development stage, the user will use the element "Actor" when the user works on building block Use Cases. By knowing that the "Actor" element has been placed in the Use Case 1 building block, that building block will be one of the required building blocks for the requirement development stage. The experience level of the user is also used to determine the importance of a particular element. For example, the "Activity 3" building block contains elements that will be used only by very experienced user as compared with the "Package" building block required by a majority of users.

Figure 6:
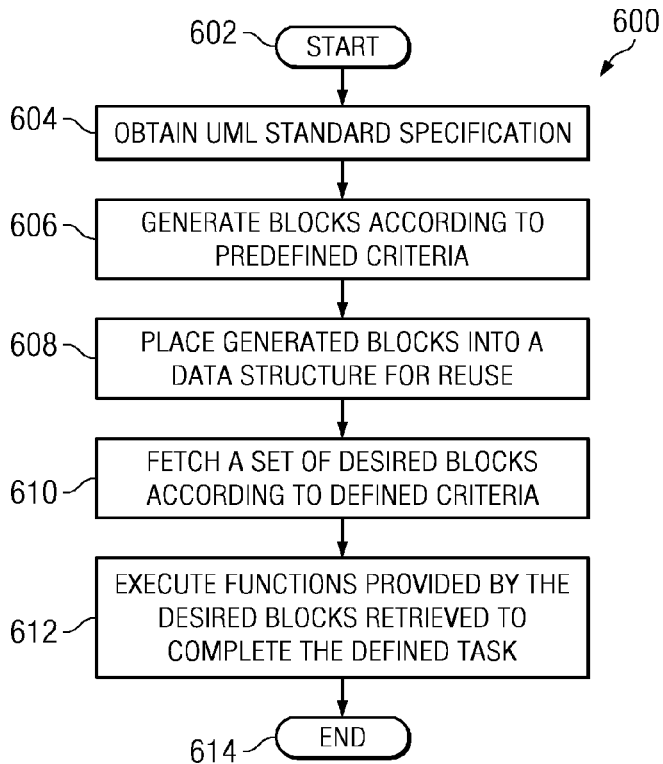
FIG. 6 is a flow diagram of a process for using modeling building blocks, in accordance with illustrative embodiments.

With reference to FIG. 6, a flow diagram of a process for using modeling building blocks is presented, in accordance with illustrative embodiments. Process 600 is an example of a process using the components of system 300 of FIG. 3.

Process 600 starts (step 602) and obtains a Unified Modeling Language specification (step 604). The specification is typically provided in the form of an industry standard as previously mentioned. Generate blocks according to predefined criteria is performed (step 606). The predefined criteria are provided by the Unified Modeling Language specification and additionally by input to the tooling of the build process. Additional criteria may include but are not limited to aspects such as target use development stage, experience level of target user, and restrictions such as one element cannot be used in more than one building block and a building block is not restricted to one element.

Place generated blocks into a data structure for reuse stores the output of step 606 into a storage area (step 608). The data structure may be a storage mechanism that allows the placement, maintenance and retrieval of the building blocks. For example, a data structure could be a database or a file system file.

Fetch a set of desired blocks according to defined criteria selectively retrieves a specific subset of building blocks from the set of stored building blocks (step 610). A subset of desired building blocks may be specified in the form of predefined configuration information or by prompting a user for a selection. Additionally, a user may be permitted to override a predefined configured response.

A user then executes the functions provided by the desired blocks retrieved to complete the defined task (step 612) with process 600 terminating thereafter (step 614). In an alternative embodiment, a scripted response may be provided as input to the selected building blocks to execute the specific functions to complete the defined task. For example, a task to define a set of user interface requirements my use a predefined selection of Unified Modeling Language element building blocks. A previously defined script including responses may be used as input to the building blocks to produce a desired requirement output without user intervention.

Figure 7:
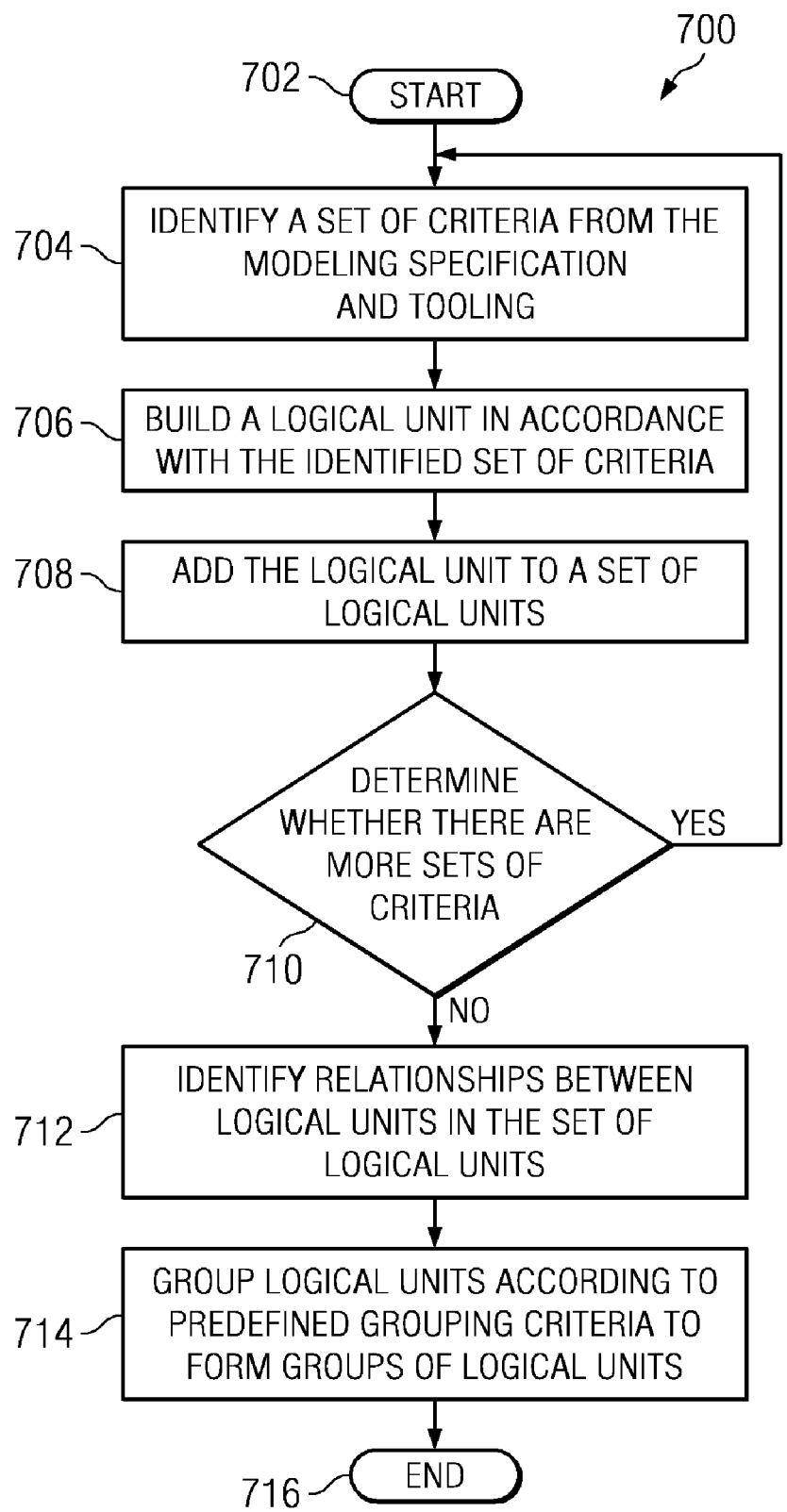
FIG. 7 is a flow diagram of a process for creating modeling building blocks, in the generate portion of FIG. 6, in accordance with illustrative embodiments.

With regard to FIG. 7, a flow diagram of a process for creating modeling building blocks in the generate portion of FIG. 6 is presented, in accordance with illustrative embodiments.

Process 700 is an example of the generate portion of FIG. 6, including steps 604-608 for obtaining the specification, and creating and storing the output. Process 700 starts (step 702) and proceeds to identify a set of criteria from the modeling specification and tooling (step 704). The Unified Modeling Language specification provides the input definitions of the various diagram and element components. The tooling provides additional criteria such as a particular development stage, a level of user experience, and a permitted combination or occurrence of an element in a building block.

Build a logical unit in accordance with the identified set of criteria is performed to generate a particular building block (step 706). The logical unit is the building block. The set of criteria is the set identified in step 704. Add the logical unit to a set of logical units is performed to add the newly generated building block to a storage area containing other building blocks (step 708). Generation is typically performed on a processor unit such as that of a data processing system in which one or more processors may be used. A processor unit may be a computer or other device capable of processing the specification in the alternative.

A determination as to whether there are more sets of criteria to process (step 710). More sets of criteria indicate the need to process the specification because more definitions for elements or diagrams need to be processed. When a determination is made that there are more sets of criteria, a "yes" is obtained in step 710. When a determination is made that there are no more sets of criteria, a "no" is obtained in step 710. When a "yes" is obtained in step 710, process 700 loops back to perform step 704. When a "no" is obtained in step 710, identify relationships between logical units in the set of logical units is performed (step 712). Relationships that exist between building blocks allow the building blocks to be collected for future use. Identification criteria may be provided in various forms including a listing, array or table to describe how building blocks may be associated for use. For example, a use may pertain to development stage 1, wherein the related building blocks comprise blocks 7, 11 and 23 to complete a task associated the development stage.

Having identified related building blocks, group logical units according to predefined grouping criteria to form groups of logical units (step 714) is performed, with process 700 terminating thereafter (step 716). Groups of logical units may then be presented by a user interface to a target user, wherein the target user only receives a presentation of building blocks necessary to complete a task or process, thereby avoiding the confusion caused by unnecessary objects.

Figure 8:
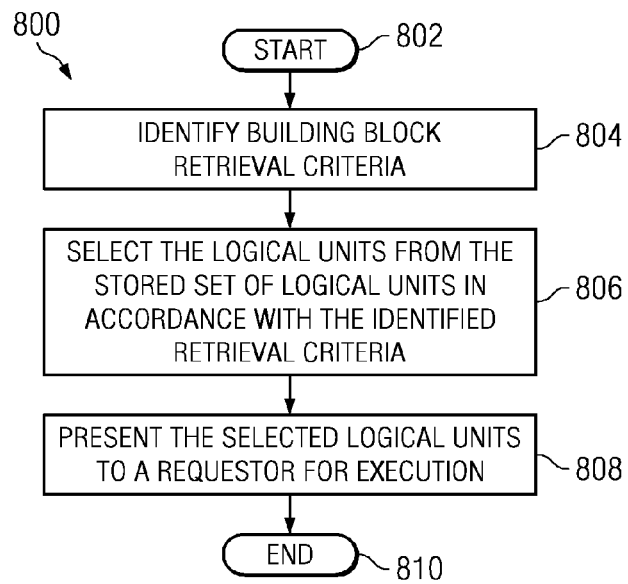
FIG. 8 is a flow diagram of a process for presenting modeling building blocks of FIG. 6, in accordance with illustrative embodiments.

With reference to FIG. 8, a flow diagram of a process for presenting modeling building blocks of FIG. 6 is provided, in accordance with illustrative embodiments. Process 800 is an example of a process of providing building blocks to a user representative of steps 610 and 612 of process 600 of FIG. 6.

Process 800 starts (step 802) and performs identify building block retrieval criteria to determine which building blocks are required (step 804). Having identified the retrieval criteria, select the logical units from the stored set of logical units in accordance with the identified retrieval criteria is performed (step 806). The specific building blocks represent the logical units extracted from the storage area where the logical units are maintained.

Present the selected logical units to a requester for execution, makes the selected building blocks available for use (step 808), with process 800 terminating thereafter (step 810). The selected building blocks are typically exposed to a user by a browser providing a user interface.

Thus, one or more of the illustrative embodiments provide a capability to generate a collection of building blocks containing a set of diagrams and elements representative of a Unified Modeling Language specification. The generated building blocks are also referred to as logical units. The building blocks provide a granular set of diagrams and elements corresponding to the Unified Modeling Language specification. The granularity provides a more flexible approach to supporting users with only the level of detail needed to perform the function or task. Controlling the level of detail reduces the potential confusion associated with the complexity and flexibility of the Unified Modeling Language specification.

The flowchart and block diagrams in the figures illustrate the architecture, functionality, and operation of possible implementations of systems, methods, and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for generating configurable Unified Modeling Language building blocks, the computer-implemented method comprising:

obtaining a Unified Modeling Language specification;

identifying from the Unified Modeling Language specification, first input definitions of diagram components and second input definitions of element components and a tooling to form an identified set of criteria, wherein the tooling provides additional criteria including a particular development stage, a level of user experience, a permitted combination of a single or of multiple elements of the Unified Modeling Language specification, and a permitted occurrence of an element in a building block;

building a logical unit in accordance with the identified set of criteria;

adding the logical unit to a set of logical units;

forming, by a processor unit, the set of logical units from the Unified Modeling Language specification into a set of building blocks, wherein each building block in the set of building blocks is a smallest logical set of Unified Modeling Language elements ready to be assembled to meet a particular usage requirement and wherein forming the set of logical units further comprises:

determining whether there are more sets of criteria;

responsive to a determination that there are no more sets of criteria, identifying relationships between logical units in the set of logical units; and grouping the logical units in the set of logical units according to predefined grouping criteria for the identified relationships to form groups of logical units;

fetching desired blocks from the set of building blocks according to predefined criteria to form a set of desired building blocks; and presenting the set of desired building blocks to a requester, wherein executing, functions provided by the set of desired building blocks on the computer complete a defined task.

2. The computer-implemented method of claim 1, wherein the tooling is optimized to handle extensible markup language source statements with added definitions for a specific project requiring a new diagram or new type of element component not in standard definitions of the Unified Modeling Language specification and to collect Unified Modeling Language defined elements into groups not previously specified by the Unified Modeling Language.

3. The computer-implemented method of claim 1, wherein fetching desired blocks from the set of building blocks further comprises:
   identifying building block retrieval criteria to form identified retrieval criteria for determining which building blocks are required;
   selecting the logical unit from a stored set of logical units in accordance with the identified retrieval criteria; and
   presenting the selected logical units to the requestor.

4. The computer-implemented method of claim 1, wherein the set of building blocks further comprises:
   a set of types of building blocks, the set of types including a diagram building block type and an element building block type.

5. The computer-implemented method of claim 1, wherein generating a set of logical units further comprises:
   a set of elements contained within the logical unit when the logical unit is an element building block, wherein an element may occur in only one building block of the set of building blocks.

6. The computer-implemented method of claim 2, wherein the identified set of criteria further comprises a set of attributes including an attribute of a development stage and an attribute of a level of experience of a target user.

7. A data processing system for generating configurable Unified Modeling Language building blocks, the data processing system comprising:
   a bus;
   a memory connected to the bus, wherein the memory contains computer-executable instructions stored therein;
   a communications unit, connected to the bus;
   a processor unit connected to the bus, wherein the processor unit executes the computer-executable instructions to direct the data processing system to:
   obtain a Unified Modeling Language specification;
   identify from the Unified Modeling Language specification, first input definitions of diagram components and second input definitions of element components and a tooling to form an identified set of criteria, wherein the tooling provides additional criteria including a particular development stage, a level of user experience, a permitted combination of a single or of multiple elements of the Unified Modeling Language specification, and a permitted occurrence of an element in a building block;
   build a logical unit in accordance with the identified set of criteria;
   add the logical unit to a set of logical units;
   form, by a processor unit, the set of logical units from the Unified Modeling Language specification into a set of building blocks, wherein each building block in the set of building blocks is a smallest logical set of Unified Modeling Language elements ready to be assembled to meet a particular usage requirement and wherein forming the set of logical units further comprises:
   determining whether there are more sets of criteria;
   responsive to a determination that there are no more sets of criteria, identifying relationships between logical units in the set of logical units; and
   grouping the logical units in the set of logical units according to predefined grouping criteria for the identified relationships to form groups of logical units;
   fetch desired blocks from the set of building blocks according to predefined criteria to form a set of desired building blocks; and
   present the set of desired building blocks to a requester, wherein executing functions provided by the set of desired building blocks by the processor unit completes a defined task.

8. The data processing system of claim 7, wherein, wherein the tooling is optimized to handle extensible markup language source statements with added definitions for a specific project requiring a new diagram or new type of element component not in standard definitions of the Unified Modeling Language specification and to collect Unified Modeling Language defined elements into groups not previously specified by the Unified Modeling Language.

9. The data processing system of claim 7, wherein the processor unit executes the computer-executable instructions to direct the data processing system to fetch desired blocks from the set of building blocks further comprises:
   identify building block retrieval criteria to form identified retrieval criteria for determining which building blocks are required;
   select the logical unit from a stored set of logical units in accordance with the identified retrieval criteria; and
   present the selected logical units to the requester.

10. The data processing system of claim 7, wherein the set of building blocks further comprises:
    a set of types of building blocks, the set of types including a diagram building block type and an element building block type.

11. The data processing system of claim 7, wherein a set of logical units further comprises a set of elements contained within the logical unit when the logical unit is an element building block, wherein an element may occur in only one building block of the set of building blocks.

12. The data processing system of claim 8, wherein the identified set of criteria further comprises a set of attributes including an attribute of a development stage and an attribute of a level of experience of a target user.

13. A computer program product for generating configurable Unified Modeling Language building blocks, the computer program product comprising:
    a non-transitory computer-readable medium having computer-executable instructions stored thereon, wherein the computer-executable instructions comprise:
    computer-executable instructions for obtaining a Unified Modeling Language specification;
    computer-executable instructions for identifying from the Unified Modeling Language specification, first input definitions of diagram components and second input definitions of element components and a tooling to form an identified set of criteria, wherein the tooling provides additional criteria including a particular development stage, a level of user experience, a permitted combination of a single or of multiple elements of the Unified Modeling Language specification, and a permitted occurrence of an element in a building block;

computer-executable instructions for building a logical unit in accordance with the identified set of criteria;

computer-executable instructions for adding the logical unit to a set of logical units;

computer-executable instructions for forming the set of logical units from the Unified Modeling Language specification into a set of building blocks, wherein each building block in the set of building blocks is a smallest logical set of Unified Modeling Language elements ready to be assembled to meet a particular usage requirement and wherein forming the set of logical units further comprises:

determining whether there are more sets of criteria;

responsive to a determination that there are no more sets of criteria, identifying relationships between logical units in the set of logical units; and grouping the logical units in the set of logical units according to predefined grouping criteria for the identified relationships to form groups of logical units;

computer-executable instructions for fetching desired blocks from the set of building blocks according to predefined criteria to form a set of desired building blocks; and computer-executable instructions for presenting the set of desired building blocks to a requester, wherein executing functions provided by the set of desired building blocks, on a computer, completes a defined task.

14. The computer program product of claim 13, wherein the tooling is optimized to handle extensible markup language source statements with added definitions for a specific project requiring a new diagram or new type of element component not in standard definitions of the Unified Modeling Language specification and to collect Unified Modeling Language defined elements into groups not previously specified by the Unified Modeling Language, and wherein the identified set of criteria further comprises a set of attributes including an attribute of a development stage and an attribute of a level of experience of a target user.

15. The computer program product of claim 13, wherein computer-executable instructions for fetching desired blocks from the set of building blocks further comprises:

computer-executable instructions for identifying building block retrieval criteria to form identified retrieval criteria for determining which building blocks are required;

computer-executable instructions for selecting the logical unit from a stored set of logical units in accordance with the identified retrieval criteria; and computer-executable instructions for presenting the selected logical units to the requester.

16. The computer program product of claim 13, wherein the set of building blocks further comprises:

a set of types of building blocks, the set of types including a diagram building block type and an element building block type.

17. The computer program product claim 13, wherein computer-executable instructions for generating a set of logical units further comprise:

a set of elements contained within the logical unit when the logical unit is an element building block, wherein an element may occur in only one building block of the set of building blocks.

* * * * *